May 13, 1958     T. F. SCHMIDT     2,834,161
ADJUSTABLE PORTABLE GRINDING TOOL
Filed July 1, 1957
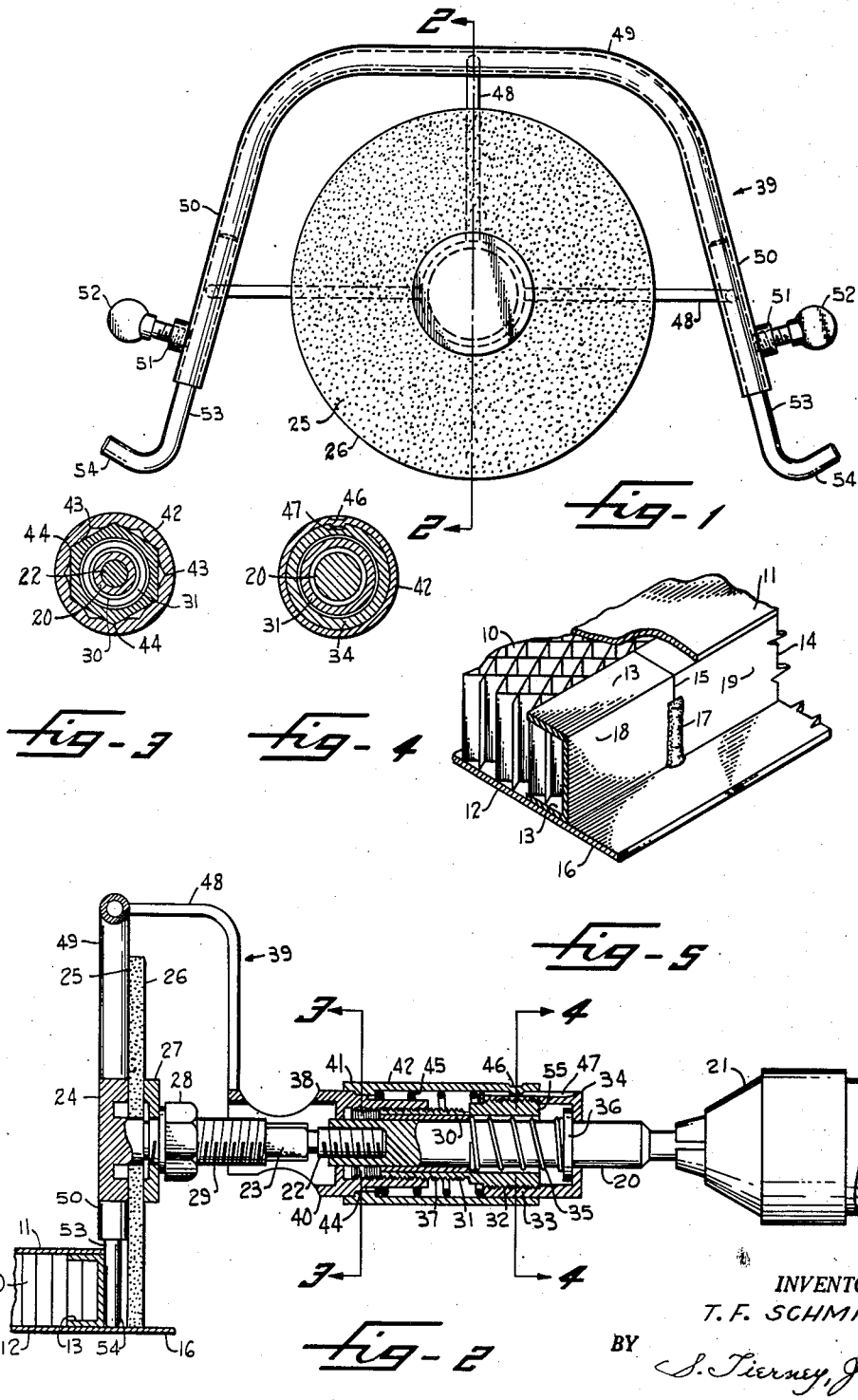
INVENTOR.
T. F. SCHMIDT
BY
S. Tierney, Jr.
ATTORNEY

United States Patent Office 2,834,161
Patented May 13, 1958

2,834,161

ADJUSTABLE PORTABLE GRINDING TOOL

Theodore F. Schmidt, National City, Calif., assignor to Rohr Aircraft Corporation, Chula Vista, Calif., a corporation of California Application July 1, 1957, Serial No. 668,983

6 Claims. (Cl. 51—166)

This invention relates to a tool adapted to be attached to the chuck of a portable drill motor and which drives a grinding wheel.

An object of the invention is to provide on the front end of the tool a guide having a pair of spaced apart legs whose ends rest against the workpiece being ground and guide the grinding wheel along a predetermined path as the tool is moved along the workpiece.

Another object is to provide readily adjustable means whereby the length of one or both legs can be changed to vary the spacing between the periphery of the grinding wheel and workpiece.

Another object is to provide in the tool means for supporting the grinding wheel for rotary and longitudinal adjustment and screw threaded means for limiting the forward movement of the grinding wheel with reference to the workpiece to prevent the operator from grinding too much material off the workpiece and thus destroying its utility or marring its appearance.

Further objects wil become apparent as a description of the tool proceeds. For a better understanding of the invention, reference is made to the accompanying drawing, in which:

Figure 1 is a front end view of a tool embodying the invention;

Figure 2 is a longitudinal view, partly in section, taken on line 2—2 of Figure 1;

Figure 3 is a sectional view taken on line 3—3 of Figure 2;

Figure 4 is a sectional view taken on line 4—4 of Figure 2 and;

Figure 5 is an enlarged isometric view showing a portion of the workpiece at a brazed joint therein.

The tool is shown being used for grinding away excess braze metal from a metal panel having a honeycomb core. Such panels are made in which thin strips of braze metal are placed between the ends of cellular core 10 and upper and lower metal skins or sheets 11, 12 and also between one end of the core and the aligned straight metal channels 13, 14 which abut each other at the joint 15 (Fig. 5). Sheets 11, 12 are plane and parallel and lower sheet 12 has a shell portion 16 which extends rearwardly past channels 13, 14. Such an assembly can be placed in a fixture of the type described in pending patent application of H. R. Herman et al., Serial No. 471,394, filed November 26, 1954 and heated in a furnace to a brazing temperature as described in said application. During the brazing some of the braze metal often runs through the joint 15 to form an elongated mass 17 which, when the assembly cools, is attached to channels 13, 14 and sheet 12. Since mass 17 is usually of irregular shape and protrudes beyond the rear vertical faces 18, 19 of the channels, it is unsightly and must often be removed. It is a purpose of the present invention to remove protruding metal masses of this type without substantially damaging the channels 13, 14 or sheet 12.

The tool comprises a generally cylindrical shaft 20 whose rear end is exposed to be gripped by the chuck 21 of a portable hand drill (not shown) of the usual type driven by electricity or compressed air. The front end of shaft 20 has a tapped hole to receive the screw threaded end 22 of a spindle 23 whose front end is provided with an integral disc 24. The front face 25 of a thin cylindrical grinding wheel 26 is held against disc 24 by a washer 27 and a nut 28 screwed onto an enlarged threaded portion 29 of spindle 23. Shaft 20 is supported for rotary and endwise movement by a cylindrical bearing or bushing 30 which is fast to a surrounding sleeve 31. The rear end of sleeve 31 is threaded as at 32, to receive the threaded end 33 of a cap 34 whose rear end has a central bore to pass shaft 20. A coil compression spring 35 surrounds shaft 20 and normally retains it in its rearward position as shown, the front end of the spring abutting the end of bushing 30 and its rear end abutting a flange 36 integral with shaft 20. The front end of sleeve 31 has a long peripheral thread 37 of fine pitch, such as 50 turns per inch, to receive the threaded rear end of a hollow hub 38 forming part of a spider 39. The peripheral face 40 of hub 38 is cylindrical to slidingly engage the front cylindrical end 41 of an axially movable locking tube 42. Rearwardly of end 41 the interior of tube 42 is provided with a plurality of recesses or notches 43 adapted to receive a plurality of projections or teeth 44 formed on hub 38 when tube 42 is in its forward position, as shown. Although only six teeth 44 and twelve notches 43 have been shown, it will be understood that a substantially greater number of each may be used, if finer adjustments or settings of spider 39 are desired. Tube 42 is biased forwardly by a compression spring 45 and prevented from rotating by a projecting nib 46 integral with the tube and extending into a long straight groove 47 cut in the periphery of cap 34.

The hub 38 of spider 39 has three arms 48 shaped as shown to the front ends of which is welded a bent metal tube 49 whose lower diverging ends 50 are straight and spaced apart a distance greater than the diameter of grinding wheel 26. Thin discs 51 are fastened to tube ends 50 by solder or other means (not shown) and each disc and tube wall is tapped to receive a threaded thumbscrew 52. Slidable within each tube end 50 is the straight portion of a supporting and guide leg 53 whose lower end 54 is preferably bent, as shown. By loosening the thumbscrews 52, it will be obvious that the effective length of the guide legs can be adjusted.

In using the tool, the rear end of shaft 20 is fastened in chuck 21 and the drill motor run at slow speed. The motor and tool are advanced toward the workpiece and lowered toward shelf 16. Thumbscrews 52 are loosened and the legs 53 raised or lowered within tube ends 50 until when the leg ends 54 rest on shelf 16, the rotating wheel 26 just clears the top face of shelf 16. The thumbscrews 52 are now tightened to lock the legs 53 in position with the bent portions 54 of both legs lying in the same vertical plane. The drill and tool are now advanced toward channel 13 with the axis of grinding wheel off to one side of braze metal 17 and with the bottoms of legs 53 resting on shelf 16 as shown in Figure 2. The drill motor is then moved forward causing legs 53 to rest against channel face 18 or channel faces 18—19 and shaft 20 to advance within bearing 30 until flange 36 strikes against the rear end 55 of sleeve 31. Assume that front face 25 of wheel 26 is now spaced .010 inch from channel face 18. The drill motor and tool are now retracted until clear of the workpiece, locking tube 42 is moved rearwardly against the force of spring 45 to disengage the front end of the tube from teeth 44. Spider 39 is now manually rotated, its thread moving along thread 37 of sleeve 31 until the spider has moved rearwardly with reference to wheel 26 a distance slightly less than .010 inch. Locking tube 42 is now released spring 45 causing it to move forward and its front end to lock with teeth 44. If due to nonregistry of notches 43 with teeth 44 the tube does not lock, spider 39 is rotated through a small angle until registry and locking occur.

The drill motor is now run at full speed and it and the tool advanced until legs 43 rest on shelf 16 and against channel faces 18 and 19. Forward pressure is applied to the drill motor until flange 36 abuts sleeve face 55. As the grinding wheel advances it will grind away a portion of metal mass 17 and by moving the motor and tool back and forth in a horizontal plane while the legs 53 slide along channel faces 18 and 19, the entire metal mass 17 is ground away and a smoooth brazed joint produced without damaging the channels 13, 14 or shelf 16.

This invention may be embodied in other forms or carried out in other ways without departing from the spirit or essential characteristics thereof. The present embodiment of the invention is therefor to be considered as in all respects illustrative and not restrictive, the scope of the invention being indicated by the appended claims, and all changes which come within the meaning and range of equivalency of the claims are intended to be embraced therein.

Having thus described my invention, what I claim as new and useful and desire to secure by Letters Patent is:

1. A portable tool adapted to grind material protruding beyond the substantially plane face of a long member comprising, in combination: a shaft disposed substantially normal to the plane of said face and having a rear end exposed to be gripped by a rotating chuck; a grinding wheel adjacent said plane face and secured to the front end of said shaft; a hollow casing surrounding said shaft; a bearing secured within said casing, said bearing supporting said shaft for both rotary and axial movement; a stop within said casing to limit the movement of said shaft towards said plane face; and a pair of spaced apart legs attached to said casing, said legs being constructed to slide along said plane face and guide said grinding wheel while said wheel is grinding away said protruding material and also to prevent said grinding wheel from contactng said plane face when said shaft is in its extreme forward position against said stop.

2. A tool as claimed in claim 1, in which the interior of said casing is provided with a screw threaded sleeve concentric with said shaft and said legs are attached to a spider having threaded engagement with the thread of said sleeve whereby rotation of said spider adjusts the spacing between the plane passing through said legs and the front face of the grinding wheel.

3. A tool as claimed in claim 1, in which said legs comprise a tube having two straight terminal portions; two short rods extending into and slidable along said terminal portions; and means for locking said rods to said tube at desired adjusted positions thereof.

4. A portable tool adapted to grind material protruding beyond the substantially plane face of a long member comprising, in combination, a shaft disposed substantially normal to the plane of said face and having a rear end adapted to be gripped by a rotatable chuck, the front end of said shaft having a threaded central portion, a spindle whose rear end has threaded engagement with said threaded portion; a thin grinding wheel attached to the front portion of said spindle; a sleeve surrounding said shaft and supporting said shaft for rotary and endwise movement, said sleeve having externally threaded front and rear ends; a cap screwed onto the rear end of said sleeve, said cap having a central bore through which the rear end of shaft passes and a long peripheral slot parallel to the axis of said shaft; a locking tube surrounding said sleeve and cap and having a nib extending into and slidable along said peripheral slot, the front end of said locking tube having a plurality of spaced apart notches; a spider provided at its front end with two spaced apart legs adapted to slide along said plane face and at its rear end with a hub having threaded engagement with the front end of said sleeve, said hub also having a plurality of spaced apart teeth adapted to enter the notches in said locking tube in response to the forward movement of said locking tube.

5. A tool as set forth in claim 4, in which a coiled compression spring has one end in contact with said cap and its other end in contact with said locking tube to bias said locking tube forwardly.

6. A tool as set forth in claim 4, in which said shaft is provided within said cap with a flange adapted to abut said cap to limit the rearward movement of said shaft and to abut said sleeve to limit the forward movement of said shaft.

References Cited in the file of this patent

UNITED STATES PATENTS

| 1,749,705 | Hudspith | Mar. 4, 1930 |

FOREIGN PATENTS

| 17,268 | Great Britain | May 8, 1913 |
| 933,294 | France | Apr. 15, 1948 |